United States Patent [19]

Smay

[11] 4,437,047
[45] Mar. 13, 1984

[54] SYSTEM FOR AUTONOMOUS EARTH-POINTING ACQUISITION OF A DUAL-SPIN SATELLITE

[75] Inventor: John W. Smay, Torrance, Calif.

[73] Assignee: Hughes Aircraft Company, El Segundo, Calif.

[21] Appl. No.: 282,776

[22] Filed: Jul. 13, 1981

[51] Int. Cl.³ .............................................. B64C 17/06
[52] U.S. Cl. .................................... 318/649; 318/616; 244/164; 244/171
[58] Field of Search ................ 318/649, 616; 244/159, 244/164, 171

[56] References Cited

U.S. PATENT DOCUMENTS

| | | | |
|---|---|---|---|
| 3,424,402 | 1/1969 | Bulloch et al. | 244/164 |
| 3,984,072 | 10/1976 | von Pragenau et al. | 244/171 X |
| 4,266,173 | 5/1981 | McTigue et al. | 318/616 X |
| 4,272,045 | 6/1981 | Phillips | 244/164 X |
| 4,294,420 | 10/1981 | Broquet | 244/171 X |
| 4,345,728 | 8/1982 | Neufeld | 244/164 X |

FOREIGN PATENT DOCUMENTS 2310767  3/1972  Fed. Rep. of Germany ...... 318/649

*Primary Examiner*—B. Dobeck
*Attorney, Agent, or Firm*—C. L. Anderson; W. J. Benman, Jr.; A. W. Karambelas

[57] ABSTRACT

Apparatus for controlling the pointing position of the payload platform of a dual-spin satellite. A torque motor which controls the relative position of the payload platform is controlled by means of a closed-loop feedback system which points the line-of-sight of the platform at a predetermined position on the earth. The control circuitry comprises position and rate sensing devices which monitor the relative position of the line-of-sight and the relative rotational rate of the payload platform. The line-of-sight of the platform is compared to signals indicative of the angular subtense of the earth. If the line-of-sight is pointed at the earth, then position command signals control the torque motor. If, however, the line-of-sight of the platform is not directed at the earth, then rate command signals are summed with the position command signals and subsequently applied to the motor. The combination of the position and rate command signals provides for a system in which the equilibrium state of the system is such that the platform will be despun and earth-pointed. A method of controlling the pointing position of the satellite is also disclosed.

3 Claims, 9 Drawing Figures

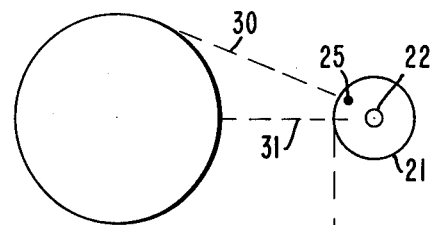
Fig. 2a.
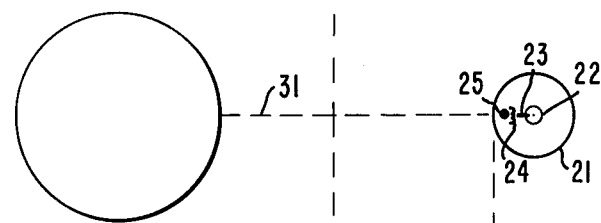
Fig. 2b.
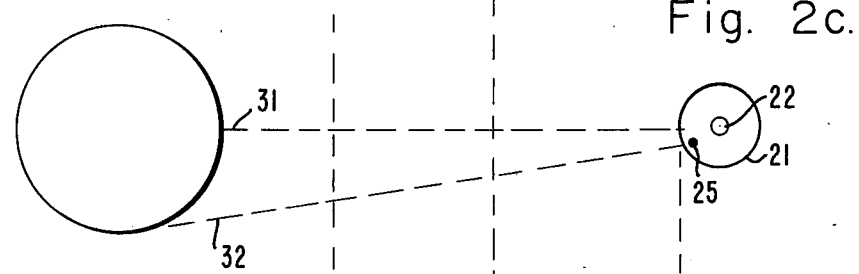
Fig. 2c.
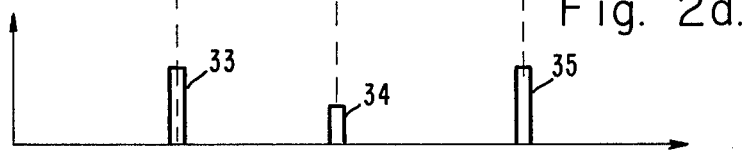
Fig. 2d.
Fig. 5.
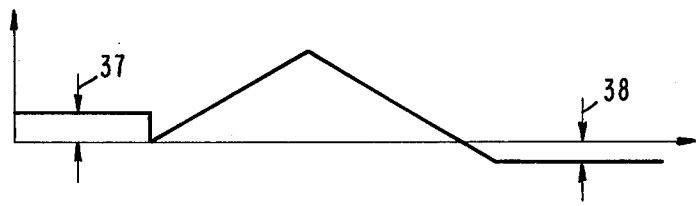
Fig. 6.
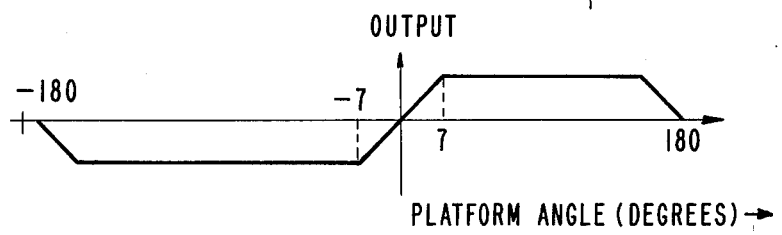
PLATFORM ANGLE (DEGREES) →

SYSTEM FOR AUTONOMOUS EARTH-POINTING ACQUISITION OF A DUAL-SPIN SATELLITE

BACKGROUND OF THE INVENTION

The present invention relates generally to apparatus for controlling the pointing direction of a dual-spin satellite, and more particularly, to a closed-loop feedback system which employs both position and rotation rate information to control the pointing position of the payload platform of the dual-spin satellite.

A dual-spin satellite is a stabilized, or unstabilized, orbiting device having a spinning portion or rotor, and a despun portion or platform. However, other configurations are possible wherein only an antenna is despun. The two portions are coupled together by a despun motor and bearing assembly. The platform or antenna is usually pointed at a predetermined position on the earth, or at another satellite, or the like. Accurate control of the pointing position is critical to satellite operation.

The pointing position of the dual-spin satellite may be controlled by controlling the relative rate and relative position of the payload platform with respect to the spinning rotor. Prior art satellite pointing control systems include an open-loop system which provides for operator control of motor torque commands applied to an orbiting satellite from an earth station. The operator manipulated the rotation rate of the payload platform with respect to the earth to a low level, after which a position control loop controls the pointing position of the platform.

Another system provides for a position control loop which is utilized when the pointing direction of the platform is within a predetermined angular extent (deadband), while fixed torque signals are applied outside the deadband. The angular extent of the deadband is based on the relative rotational rate between the payload platform and rotor. A third control system comprising a phase-locked loop has been utilized which phase locks an index pulse train to an inertial sensor pulse train which indicates a known position. For multiple index pulses, the system can lock an inertial pulse to any index pulse. The system allows for manual stepping to any desired pulse which provides the correct pointing direction.

SUMMARY OF THE INVENTION

The present invention provides for a closed-loop feedback system which provides torque command signals to a torque motor that controls the pointing position of the payload platform of a dual-spin satellite. The payload platform (despun portion) of the satellite has a desired pointing position within predetermined angular limits. This desired pointing position may be a specific position on the earth, or at some other orbiting body, or the like. The system comprises a magnet and coil arrangement which provides signals indicative of the relative pointing position of the payload platform. An earth sensor is provided on the rotor (spinning portion) that generates second signals indicative of the predetermined angular limits, which is generally taken to be the angular subtense of the earth.

One portion of the circuitry determines the relative rotational rate between the rotor and payload platform, and additionally provides first torque command signals in response thereto. Another portion of the circuitry generates an error signal indicative of the relative error between the desired pointing position and the actual pointing position of the payload platform. A third portion of the circuitry generates second torque command signals in response to the error signals. Switching and summation circuitry applies the second torque command signals to the torque motor when the pointing position is within the predetermined angular limits, and applies the sum of the first and second torque command signals to the torque motor when the pointing position is outside the predetermined angular limits.

In operation, index pulses are provided by the magnet and coil arrangement on each revolution of the rotor. The index pulses indicate the pointing position of the payload platform. The earth sensor provides an output pulse which is modified to provide leading and trailing edge pulses indicative of the angular extent of the earth. The relative rate of rotation between the rotor and platform is obtained from the index pulses. One portion of the circuitry of the present invention generates the relative rate signals which in turn provide the first torque command signals (rate torque command signals). The index and earth pulses are utilized to generate the error signals which are in turn produce the second torque command signals (position torque command signals).

The circuitry determines whether or not the line-of-sight of the platform is aimed at the earth, based on the relative position of the index pulse to the leading and trailing edge pulses. When this circuitry indicates that the line-of-sight is positioned on the earth than the position torque command signals are applied to the motor for control thereof. However, when the circuitry indicates that the line-of-sight is not aimed at the earth, then switching circuitry is employed to allow the rate torque command signals to be summed with the position torque command signals and thereafter applied to the motor.

Thus the present invention provides for closed-loop feedback control of the despun portion of a dual-spin satellite. Position torque command signals are applied to the motor when the line-of-sight is positioned on the earth. When the line-of-sight is not positioned on the earth then both position and rate torque command signals are utilized to drive the motor and force the line-of-sight to be located on the earth. Additional bias signals may be applied to the position and rate torque command signals to drive the system to any predetermined location on the earth. These bias signals are generally provided by a command link from an earth station to the orbiting satellite.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 illustrates a timing diagram which shows various signals associated with the present invention;

FIG. 5 shows a graph illustrating error signals generated in the present invention;

FIG. 6 shows a graph illustrating the output signal associated with the error detector utilized in the present invention.

DETAILED DESCRIPTION OF THE INVENTION

Figure 1:
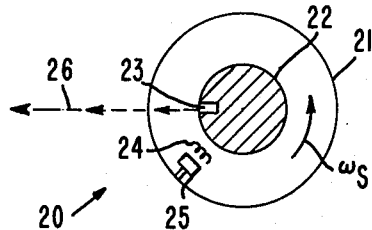
FIG. 1 illustrates a top view of a dual-spin satellite which may employ the present invention.

Referring to FIG. 1 there is shown a top view of a dual-spin satellite 20. The satellite 20 includes a spinning portion 21, alternatively referred to as rotor 21, and a despun portion, alternatively referred to as payload platform 22, which has a predetermined line-of-sight indicated by the dashed line 26. A magnet 23 is disposed on the payload platform 22 and is generally along a line coincident with the line-of-sight thereof. A coil 24 and an earth sensor 25 are disposed on the rotor 21 in a generally aligned orientation. The magnet and coil arrangement generates an index pulse on each revolution of the rotor 21. This index pulse is indicative of the position of the line-of-sight 26 of the payload platform 22. The earth sensor 25 is an infrared detector which provides an output pulse which indicates when the sensor 25 is viewing the earth.

FIGS. 2a, b and c show a diagram illustrating three positions of the rotor 21 when the earth sensor 25 is aimed at the leading edge of the earth, along the line-of-sight, and at the trailing edge of the earth, respectively. The dashed line 30 shows the line-of-sight of the sensor 25 at the leading edge of the earth, while dashed line 31 shows its position along the line-of-sight, and dashed line 32 shows the position at the trailing edge of the earth. FIG. 2d shows the output signals derived from the earth sensor pulse which correspond to to the leading and trailing edges of the earth. The leading edge pulse 33 and trailing edge pulse 35 are generated from a single output pulse from the sensor 25. The pulse 34 is indicative of that point at which the coil 24 passes the magnet 23. This pulse 34 is the index pulse mentioned hereinabove and will be hereinafter referred to as index pulse 34.

The position of the index pulse 34 relative to the leading and trailing edge pulses 33, 35 generally defines the pointing direction of the payload platform 22. The desired pointing direction is generally designated by command signals generated on earth and sent through a command link to the satellite 20. The purpose of the present invention is to despin the payload platform 22 and then control the pointing position thereof within the angular limits of the earth. Accordingly, a closed-loop feedback control circuit is provided which can accurately position the line-of-sight of the payload platform 22 by utilizing information indicated by the relative positions of the index pulse 34 and the leading and trailing edge pulses 33, 35. This information is utilized in order to provide torque command signals to a torque motor which controls the rotor 21.

Figure 3:
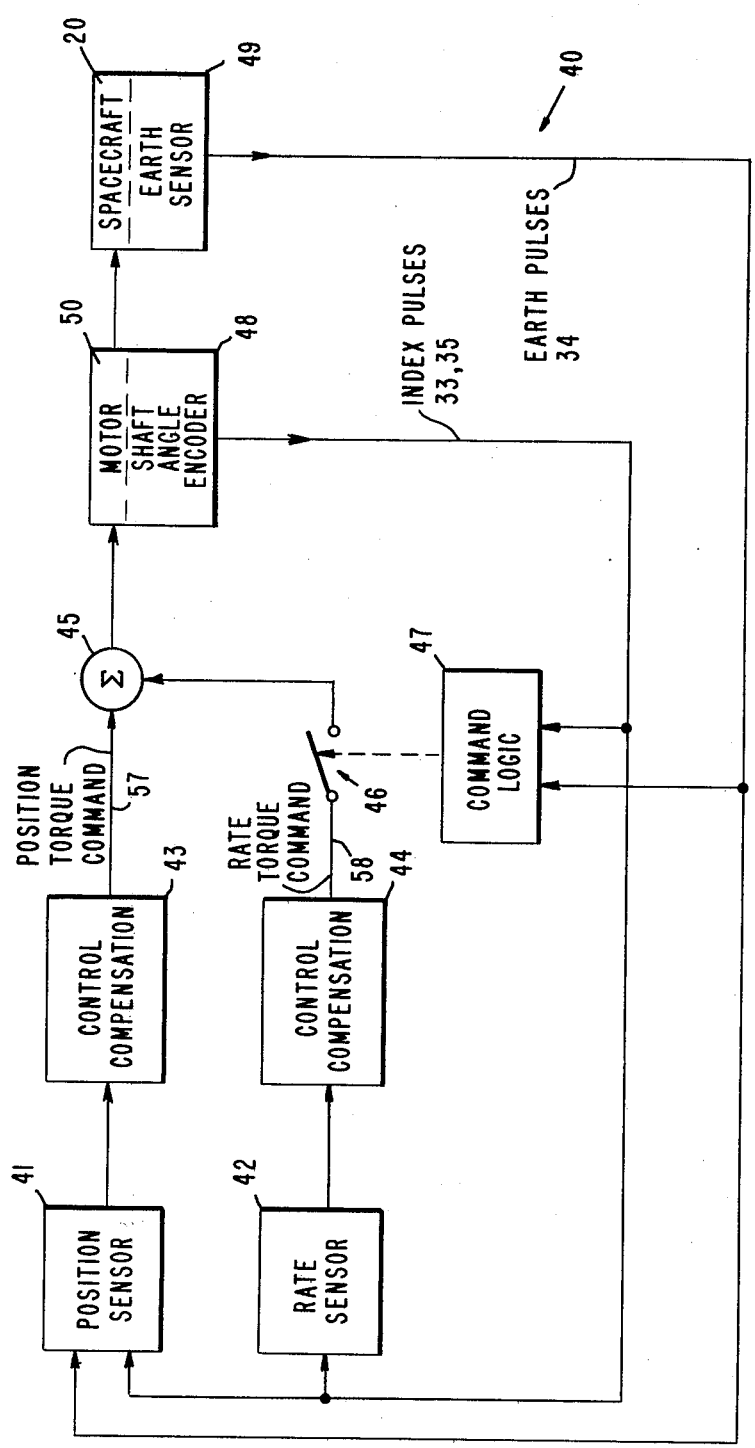
FIG. 3 illustrates a block diagram of one embodiment of the present invention.

Referring to FIG. 3 there is shown a block diagram of one embodiment of the present invention. A torque motor 50 which is generally coupled between the rotor and payload platforms of the satellite 20 as shown in FIG. 1. A shaft angle encoder 48 is provided which generates index pulses 34 which are indicative of the line-of-sight of the payload platform 22. As mentioned hereinabove, a magnet and coil arrangement may be employed as the encoder 48. The earth sensor 25 is disposed on the on the spinning rotor 21 and provides earth pulses 33, 35 which are of the general shape as indicated in FIG. 2d, pulses 33 and 35.

The index pulses 34 are applied to one input of a position sensor 41 while the earth pulses 33, 35 are applied to a rate sensor 42 and a second input of the position sensor 41. The position sensor 41 combines the the earth pulses 33, 35 and index pulses 34 in a manner to produce an error signal which is indicative of the error between the actual line-of-sight of the payload platform 22 and the desired line-of-sight thereof. This error signal is applied to control compensation circuitry 43 which generates position torque command signals 57 in response thereto. The rate sensor 42 is coupled to control compensation circuitry 44 which utilizes the index pulses 34 to generate rate torque command signals 58.

The rate torque command signals 58 are applied through a switch 46 which is controlled by command logic circuitry 47. The earth pulses 33, 35 and index pulses 34 are applied to inputs of the command logic circuitry 47, and the switch 46 is either open or closed depending upon the relative position of the index pulses 34 with respect to the earth pulses 33,34. A summing circuit 45 is provided which receives the position torque command signals 57 at a first input thereof and the rate torque command signals 58 at a second input thereof when the switch 46 is closed. The output of the summing circuitry 45 is applied to the torque motor 50, thus completing the closed-loop feedback control circuit.

The operation of the embodiment of FIG. 3 is such that the rate sensor 42 and control compensation circuitry 44 generates rate torque command signals 58 in response to index pulses 34 applied thereto. By utilizing both the earth pulses 33, 35 and index pulses 34 the position sensor 41 and control compensation circuitry 43 generate position torque command signals 57. The summing circuitry 45 applies the position torque command signals 57 to the motor 50 when the index pulses 34 are between the earth pulses 33, 35 as shown in FIG. 2d. However, when the index pulses 34 are outside the earth pulses 34, 35 then the command logic circuitry 47 closes the switch 46 which allows the rate torque command signals 58 to be summed with the position torque signals 57, and the sum thereof applied to the motor 50. The two torque signals are weighted such that the rate torque has ultimate control authority.

Figure 4:
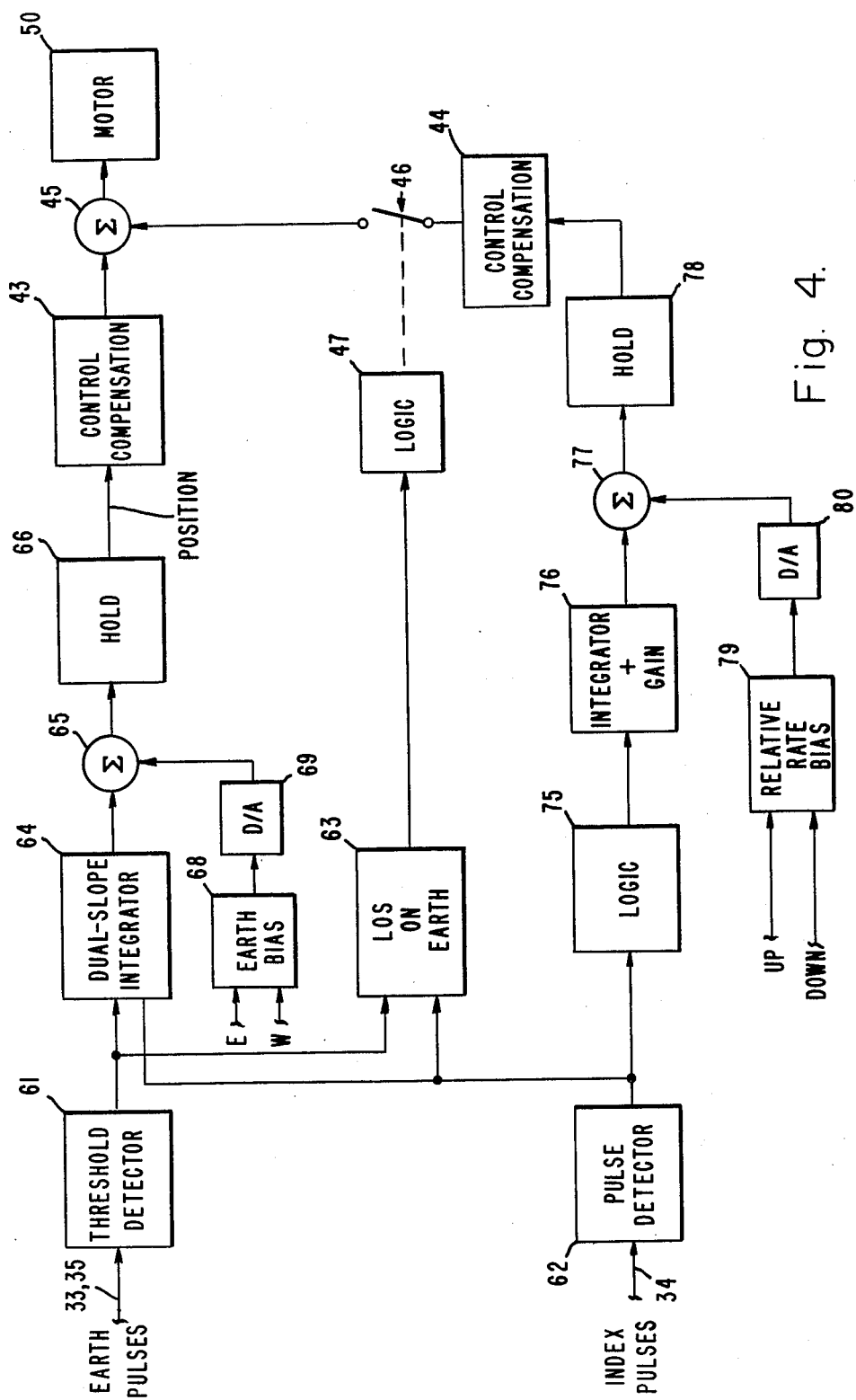
FIG. 4 illustrates a more detailed block diagram of the circuit of FIG. 3.

Referring to FIG. 4, there is shown a more detailed block diagram of the control circuit of FIG. 3. The earth pulses 33, 35 are applied to input of a threshold detector 61 whose output is applied to one input of a dual-slope integrator 64. The index pulses 34 derived from the shaft angle encoder 48 are applied to an input of a detector 62 whose output is connected to a second input of the dual-slope integrator 64. The dual-slope integrator 64 provides for integration of the signals applied thereto in a manner as depicted in FIG. 5. The integrator 64 integrates a constant voltage starting at the time of receipt of the leading edge earth pulse 33 until it detects the index pulse 34. Subsequent to receipt of the index pulse 34, the integrator 64 integrates downward until it encounters the trailing edge earth pulse 35. FIG. 5 generally shows the error signals obtained for a situation where the intended line-of-sight is at the center of the earth. The old error signal 37 (from the prior revolution) is identified at the left of FIG. 5 and is generally a voltage level depicted by the arrows. The new line-of-sight error signal 38 is shown on the right of FIG. 5.

The new line-of-sight error signal 38 generated in the dual-slope integrator 64 is applied to one input of a summing device 65. Earth bias circuitry 68 which receives east/west bias signals from an earth command station applies output signals through a D/A converter 69 to a second input of the summing device 65. The earth bias circuitry 68 allows for adjustment of the pointing direction of the line-of-sight of the despun portion 21 to control the pointing direction thereof at any point on the earth. The output of the summing device 65 is coupled to sample and hold circuitry 66 whose output is applied to control compensation circuitry 67. The control compensation circuitry 67 is an amplification circuit which filters and multiplies the voltage output of the sample and hold circuitry 66 to achieve control loop stability and desired frequency response.

The output of the detector 62 is applied through logic circuitry 75 to an analog integrator 77. The analog integrator 76 integrates a constant voltage during each spin cycle and applies this output to one input of a summing device 77. The output of the analog integrator 76 provides an indication of the relative rate of rotation of the platform 22 relative to the rotor 21. Relative rate bias circuitry 79 which receives up/down command signals from the earth station through a D/A converter 80 to a second input of the summing device 77. The output of the summing device 77 is applied to sample and hold circuitry 78. The outputs of the threshold detector 61 and detector 62 are applied to two inputs of detection circuitry 63, which determines if the line-of-sight of the platform 21 is pointed towards the earth. The detection circuitry 63 determines if the index pulse 34 is between the leading and trailing edge pulses 33, 35. The output of the detection circuitry 63 is applied through the logic circuitry 47 to the switch 46. The output of the sample and hold circuitry 78 is coupled through the switch 46 to a second input of the summing circuitry 45, whose output is coupled to the torque motor 50.

The output characteristics of the position sensor section of FIG. 4 are generally shown in FIG. 6. The error detector output signal is generally a linear function from $-7°$ to $+7°$ relative to the center of the earth. The error detector output signal is saturated at a fixed value from 7° to 173° and from $-7°$ to $-173°$. A negative linear slope is provide between 173° and $-173°$. The linear slope is provided between $-7°$ and $+7°$ because this is approximately the angular subtence of the earth relative to a satellite orbiting at 22,300 miles.

Figure 7:
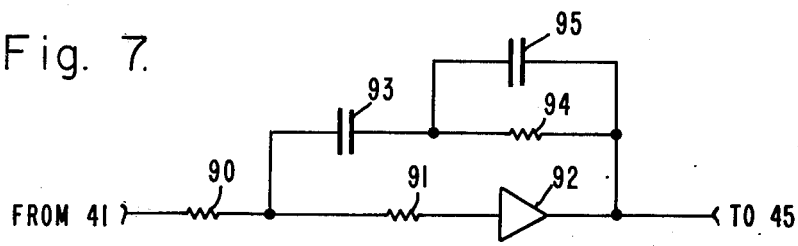
FIGS. 7, 8 and 9 show various circuits which may be employed as the summing devices shown in FIG. 4.

Referring to FIG. 7 there is shown one embodiment of control compensation circuitry 43. A simple amplification circuit is shown which includes a serial pair of input resistors 90, 91 which are coupled to an input of an operational amplifier 92. The output of the operational amplifier is applied to the one input summing circuitry 45. Feedback is taken from the output of the operational amplifier 92 through a resistor 94 in parallel with a first capacitor 95 and this parallel combination is in series with a second capacitor 93 to a point between the serial resistors 90, 91.

Figure 8:
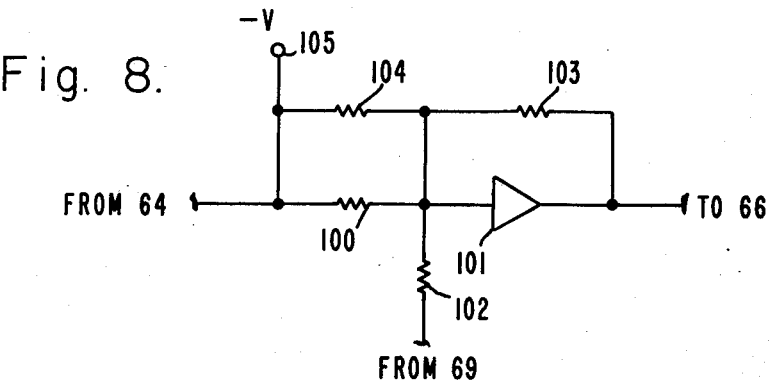
Figure 9:
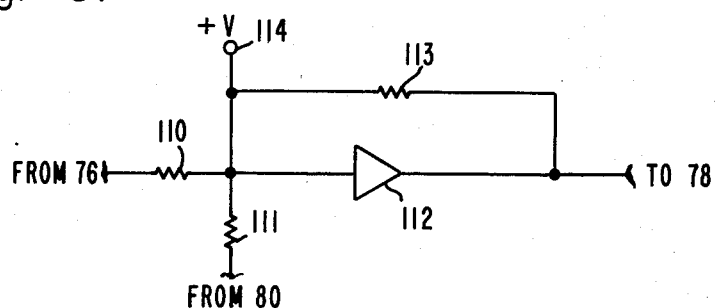

Referring to FIGS. 8 and 9 there are shown representative circuits which may be employed as the summing devices 65, 77, respectively. The summing device 65 shown in FIG. 8 comprises input resistors 100, 102 which are connected to respective outputs of the dual-slope integrator 64 and the D/A converter 69. The two input resistors 100, 102 are connected to the input of an operational amplifier 101 whose output is connected to the sample and hold circuitry 66. Feedback is taken from the output of the operational amplifer 101 through a resistor 103 to the input of the amplifier 101, while voltage bias is applied to the circuit from a negative voltage source 105 through a resistor 104 which is connected across the input resistor 100.

The summing device 77 is generally shown in FIG. 9, and comprises a pair of input transistors 110, 111 respectively coupled to the outputs of the analog integrator 76 and D/A converter 80. These resistors 100, 111 are coupled to the input of an operational amplifier 112 whose output is coupled to the sample and hold circuitry 78. Feedback is taken from the output amplifer 112 through a resistor 113 to the input of the amplifier 112, while bias voltage is applied from a positive voltage source 114 through a resistor 115 to the input of the amplifier 112. The circuits of FIGS. 8 and 9 generally operate to provide the sum of signals applied thereto in a conventional manner.

Thus, there has been provided a closed-loop feedback control system which controls the pointing position of a dual-spin satellite. The rate and position of the payload platform 22 are controlled by a torque motor 50 which receives control signals from the present system. The relative rate of rotation between the rotor and payload platforms 21, 22 is sensed by a shaft angle encoder 48 between the two units. Position is sensed by comparing the index pulse provided by the magnet and coil arragement 23, 24, which generally may be a portion of the shaft angle encoder 48, with the position of the earth chord pulse generated by the earth sensor 25 mounted on the spinning rotor 21. The index pulse is positioned such that the payload platform line-of-sight is directed towards the earth when the index pulse is within the limits of the earth chord pulse.

The motor control torque commands are derived from position and rate error signals generated by the present invention. The rate command is proportional to rate error up to a first predetermined value and is saturated at that value for larger rates. The position torque command is proportional to position error up to a saturation limit having a second predetermined value. When the line-of-sight is on the earth, that is the index pulse is between the leading and trailing edges of the earth chord pulse, position torque exclusively commands the motor. Otherwise, position and rate commands are summed to torque the motor.

The torque command capability of the present system, compared with the maximum torque command requirements of the motor, make it possible that, for large rotational rates, the rate control portion of the present invention has full control of the motor commands. Conversely, if the line-of-sight is on the earth, the rate command is disconnected, giving full control to the position control section. If the rate is reduced to zero when the line-of-sight is off the earth, the position error signals will torque the motor such the line-of-sight will be pointed towards the earth. Therefore, provided that the relative rate error is biased to a value corresponding to the rotor rate with the platform despun, and appropriate control loop gain and phase constraints are satisfied to ensure loop stability, the only equilibrium state of the system is for the platform to be despun and earth-pointed. This ensures automatic aquisition from arbitrary initial conditions.

It is to be understood that the above-described embodiment is merely illustrative of one of the many possible specific embodiments which represent applications of the principles of the present invention. Clearly, numerous and varied other arrangements may be readily devised by those skilled in the art without departing form the spirit and scope of the invention.

What is claimed is:

1. Apparatus for providing torque command signals to a torque motor which controls the pointing direction of the despun portion of a dual-spin satellite having spun and despun portions, said despun portion having a desired pointing direction within predetermined angular limits, said apparatus comprising:

first means for sensing the relative pointing position of said despun portion and providing first signals indicative thereof;

second means for providing second signals indicative of said predetermined angular limits;

third means coupled to said first and second means for generating position torque command signals;

fourth means coupled to said first means for generating rate torque command signals;

switching and summing means coupled to said third and fourth means and to said torque motor for providing said position torque command signals to said torque motor when said relative pointing position is within said angular limits, and for providing the sum of said position and rate torque signals to said torque motor when said relative pointing position is outside said angular limits.

2. Apparatus for providing torque command signals to a torque motor which controls the pointing direction of the despun portion of a dual-spin satellite having spun and despun portions, said despun portion having a desired pointing direction within predetermined angular limits, said apparatus comprising;

first means for sensing the relative pointing position of said despun portion and providing first signals indicative thereof;

second means for providing second signals indicative of said predetermined angular limits;

third means coupled to said first means for determining the relative rotational rate between said spun and despun portions and providing first torque command signals in response thereto;

fourth means coupled to said first and second means for providing error signals indicative of the relative error between said pointing position and said desired pointing position of said despun portion;

fifth means coupled to said fourth means for providing second torque command signals in response to said error signals; and sixth means coupled to said first, second, third and fifth means and to said torque motor for providing said second torque command signals to said motor when said relative pointing position is within said predetermined angular limits and for providing the sum of said first and second torque command signals to said torque motor when said pointing position is outside said predetermined angular limits.

3. A method of controlling the pointing position of the despun portion of a dual-spin satellite having spun and despun portions, said despun portion having a desired pointing direction within predetermined angular limits, said method comprising the steps of:

generating position torque command signals;

generating rate torque command signals;

determining if the desired pointing direction is within said predetermined angular limits;

applying said position torque command signals to the torque motor when the pointing position is within said predetermined angular limits; and applying the sum of said position and rate torque command signals to said torque motor when the pointing direction is outside said predetermined angular limits.

* * * * *